United States Patent
Park et al.

(10) Patent No.: US 8,411,981 B2
(45) Date of Patent: Apr. 2, 2013

(54) METHOD OF REMOVING BLUR WITHOUT RINGING-ARTIFACT

(75) Inventors: Min-Kyu Park, Seoul (KR); Sung-Dae Cho, Yongin-si (KR)

(73) Assignee: Samsung Electronics Co., Ltd., Samsung-ro, Yeongtung-gu, Suwon-si, Gyeonggi-do (KR)

( * ) Notice: Subject to any disclaimer, the term of this patent is extended or adjusted under 35 U.S.C. 154(b) by 1079 days.

(21) Appl. No.: 12/185,156

(22) Filed: Aug. 4, 2008

(65) Prior Publication Data

US 2009/0034866 A1   Feb. 5, 2009

(30) Foreign Application Priority Data

Aug. 2, 2007 (KR) .................. 10-2007-0077751

(51) Int. Cl.
*G06K 9/40* (2006.01)
*G03B 13/00* (2006.01)
*H04N 5/232* (2006.01)

(52) U.S. Cl. ........ 382/255; 382/263; 382/264; 382/275; 348/345

(58) Field of Classification Search ............... 382/255, 382/263, 264, 275; 348/345
See application file for complete search history.

(56) References Cited

U.S. PATENT DOCUMENTS

| 5,710,829 | A  | * | 1/1998  | Chen et al. ............... 382/173 |
| 5,777,690 | A  | * | 7/1998  | Takeda et al. ............ 348/699 |
| 6,154,574 | A  | * | 11/2000 | Paik et al. ............... 382/255 |
| 7,599,568 | B2 | * | 10/2009 | Aoyama ................... 382/255 |
| 7,941,002 | B2 | * | 5/2011  | Samadani et al. ......... 382/298 |

FOREIGN PATENT DOCUMENTS

KR   10-2007-0094179 A   9/2007

* cited by examiner

*Primary Examiner* — Matthew Bella
*Assistant Examiner* — Jose M Torres
(74) *Attorney, Agent, or Firm* — Cha & Reiter, LLC

(57) ABSTRACT

Provided is an image processing method and apparatus for removing blur in a screen image, including detecting blur in an input image, segmenting the image according to an amount of the detected blur, performing a high pass filtering of the segmented image in a horizontal direction and a vertical direction, detecting corresponding weights by using corresponding coefficients of each direction obtained from filtering; and restoring the image by applying the detected weights to one of: an iterative form or a closed form of an image restoration.

18 Claims, 3 Drawing Sheets

METHOD OF REMOVING BLUR WITHOUT RINGING-ARTIFACT

CLAIM OF PRIORITY

This application claims the benefit of the earlier filing date, under 35 U.S.C. §119(a), to that patent application entitled "Method of Removing Blur without Ringing-Artifact" filed in the Korean Intellectual Property Office on Aug. 2, 2007 and assigned Serial No. 2007-77751, the contents of which are hereby incorporated by reference.

BACKGROUND OF THE INVENTION

1. Field of the Invention

The present invention relates to field of image processing, and more particularly to a image processing method and an apparatus for removing blur without ringing-artifact in order to restore the image without ringing-artifact.

2. Description of the Related Art

The functions of a mobile communication terminal are typically varied in response to a customer's requirements and/or desires. In addition to a basic call function, the mobile communication terminal may include numerous other functions, such as games, web search, e-mail reception and transmission, and payment, as well as photographing using a camera and TV watching through DMB reception.

Improvements in the quality of the images taken by the camera and the image quality of DMB reception is of significant importance. Particularly, there is a need for a technology for restoring the image without ringing-artifact which often occurs in a procedure of removing blur in order to improve image quality.

The "ringing" phenomenon refers to a condition when an image is reproduced in an image device, such as a TV, vibratory patterns, such as white shadows, occur around the edges of the image. These white shadows at the edges represents an image deviation. Since the ringing phenomenon represents a cause of image quality reduction it is necessary that the ringing phenomenon be attenuated upon reproducing the image.

Conventional method of removing blur, are known in the art. For example, such methods are one of boosting high frequency components, one of using image restoration, and one of a super resolution (SR) method of restoring a high-resolution image using multiple low-resolution images.

In the above-mentioned conventional methods of removing blur, the method of boosting high frequency components has advantages that it is simple and requires less calculations, but has the disadvantage that image quality could not be improved fundamentally. Further, the SR method can basically improve image quality, but has disadvantages that memory is needed to store multiple low-resolution images and required calculations are too large to apply to a system. On the contrary, the method of using image restoration has a relatively small amount of calculations and could remove the blur fundamentally, so it has become widely available in reality.

Image acquisition modeling can be expressed in a matrix-vector models as equation (1) below:

$$y = Hx + n \quad (1)$$

where x is an original signal, y is a signal to be obtained and restored, H is blur, and n is noise.

Using equation (1), when a general restoration technique is employed for restoring the original signal x, an estimated x is obtained by equation (2) and equation (3) below:

$$x = \text{inv}(H'H + \alpha C'C)H'y, \quad (2)$$

$$x(n+1) = x(n) + \beta(H'y - (H'H + \alpha C'C)x(n)) \quad (3)$$

where inv(k) represents the inverse matrix of k, α is a regularization parameter, H' represents a transpose vector of H, and β is an iterative step.

Using equations (2) and (3), it is necessary to obtain an inverse matrix of the blur H in order to obtain an estimated value of an original signal. Here, the product of matrix H and the inverse matrix of H should be an identity matrix. That is, the product of matrix H and inverse matrix of H is an identity matrix refers to that this value corresponds to an all pass filter. However, since H corresponds to a high pass filter, high frequency components of the inverse matrix of H are excessively amplified. However, since H includes high frequency components, there is no inverse matrix of H substantially, or these high frequency components are amplified too much, and thus it causes ringing-artifact. Therefore, a constraint, such as $\alpha \|Cx\|^2$, is used in order to reduce unnecessary ringing-artifact.

Therefore, as a result of the general image restoration in the form of equations (2) and (3) above, the result of equations (2) and (3) is adjusted by the regularization parameter α. When α becomes relatively small, blur is removed very well, but ringing-artifact becomes increases. Further, there are problems in using the regularization parameter α.

First, since α is not determined automatically, it is too difficult to estimate an α that achieves a best result.

Second, since α is identically applied to the entire image, statistical features of partial images are not reflected properly.

Third, it is difficult to reduce both blur and ringing-artifact by one regularization parameter.

Therefore, it is difficult for both blur removal and ringing-artifact removal to be performed well enough to be satisfied by just only regularization parameter.

SUMMARY OF THE INVENTION

The present invention provides a method and an apparatus for removing blur in order to restore the image without introducing ringing-artifact, which often occurs in a procedure of removing the blur generated during image acquisition in order to improve image quality.

In accordance with an aspect of the present invention, an image processing method of removing blur in a screen includes: detecting blur from an input image, segmenting the image according to an amount of the detected blur, performing a high pass filtering for each of a horizontal direction and a vertical direction of the segmented images, detecting weights corresponding to each of the vertical and horizontal directions by using corresponding coefficients obtained by the filtering for each direction; and restoring the image by applying the detected weights to an iterative form or a closed form of an image restoration.

In accordance with another aspect of the present invention, there is provided an image processing apparatus for removing blur in a screen, including an image segmentation unit for detecting an amount of blur from an input image, and segmenting the image according to an amount of blur to be removed, a high pass filter for filtering for each of a horizontal direction and a vertical direction of the segmented images, and outputting coefficients associated with each direction, a β-calculation unit for calculating a weight β of each direction of an corresponding image segment using the filtered coefficients and an image restoration unit for restoring the corresponding image segment by applying the calculated β values to an iterative form or a closed form of an image restoration.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
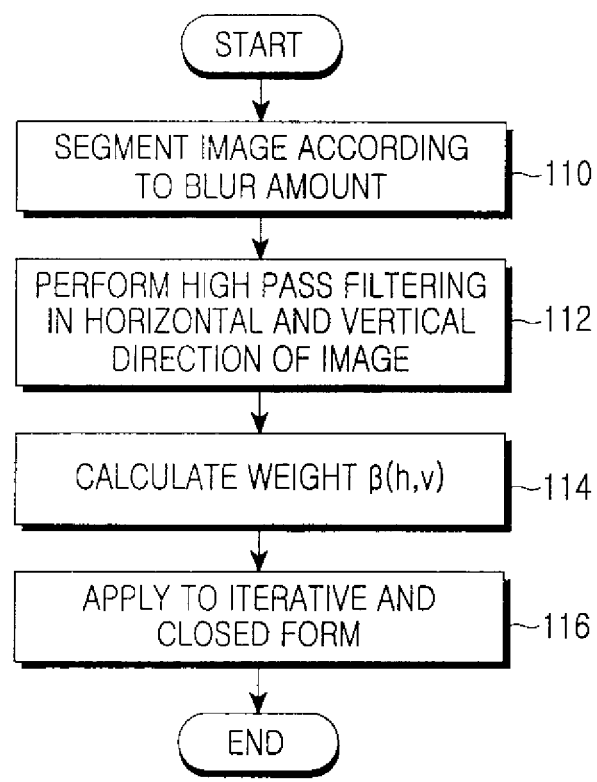
FIG. 1 is a flowchart illustrating a sequence of a blur removing method without ringing-artifact according to an embodiment of the present invention.

Exemplary embodiments of the present invention are described with reference to the accompanying drawings. In the following description, the same elements will be designated by the same reference numerals although they are shown in different drawings, contents of displayed information, etc., are provided only to assist in providing a general understanding of the present invention, and it would be recognized by those skilled in the art that the present invention can be implemented without such definitions.

The present invention is intended for output of an image without ringing-artifact by applying a weight of a high-pass filtered image to a general iterative form \or a closed form of image restoration processing operation in order to reduce processing requirements in image restoration of an input image signal.

FIG. 1 shows a flowchart illustrating a sequence of a blur removing method without introducing ringing-artifact according to an embodiment of the present invention.

Referring to FIG. 1, in order to remove blur included in an input image, the blur in an image is detected, and the input image is segmented in consideration of an amount of the detected blur (step 110) in each segment.

The segmented images are subjected to high pass filtering in each of the horizontal direction and the vertical direction (step 112).

A weight of each direction, i.e., β(h, v), is calculated by using the coefficients obtained by the filtering in each direction (step 114).

An image is then restored by applying the detected weight β(h, v) to one of an iterative form of image restoration or a closed form of image restoration, to effectively remove ringing artifact in accordance with the principles of the invention (step 116).

Figure 2:
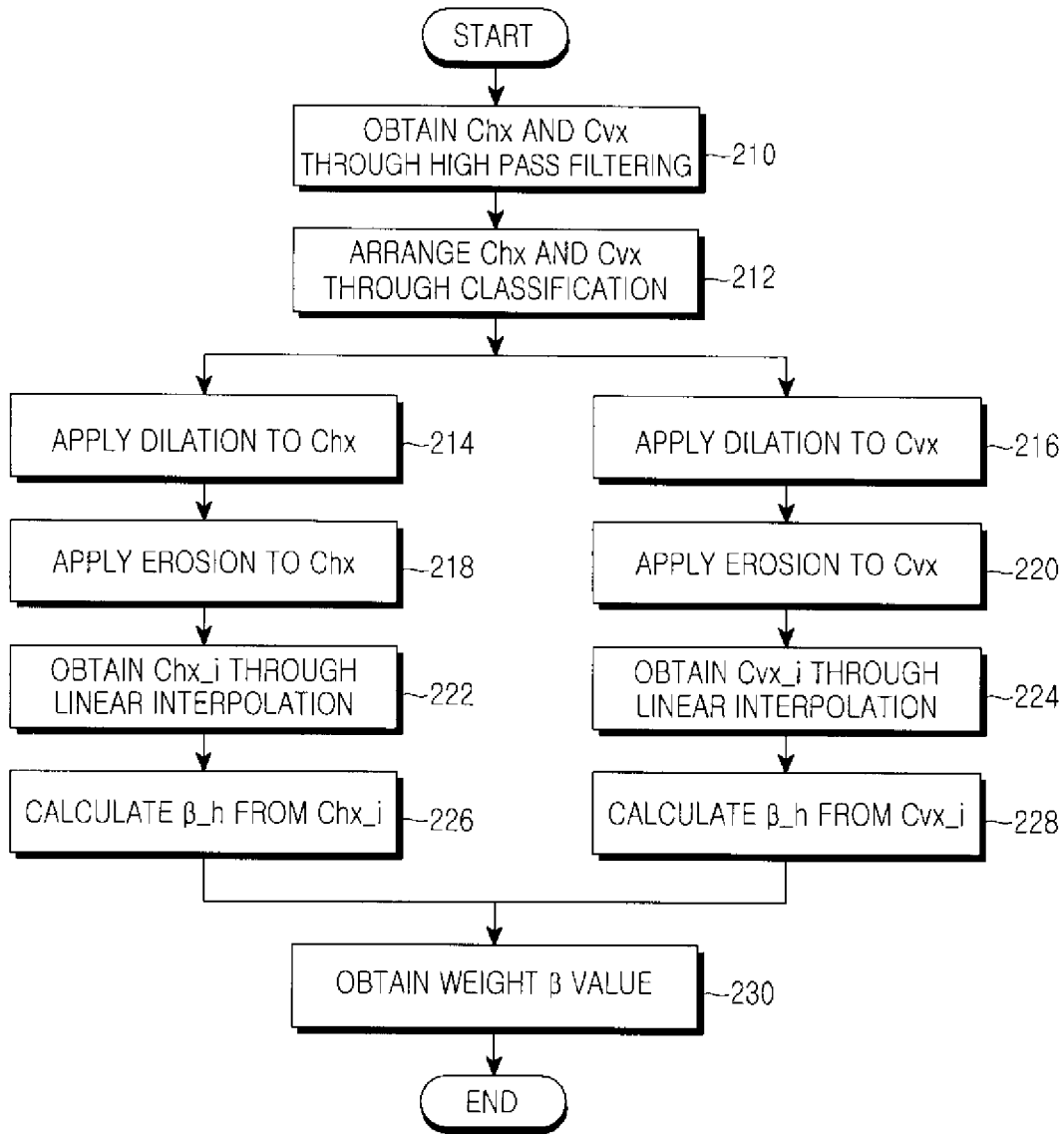
FIG. 2 is a detailed flowchart illustrating a sequence of a detecting procedure of a weight β(h, v) without ringing-artifact according to an embodiment of the present invention.

FIG. 2 shows a detailed flowchart illustrating a sequence of a detecting procedure (step 114, FIG. 1) of determining weight β(h, v) according to an embodiment of the present invention.

Referring to FIG. 2, a coefficient Chx associated with a high frequency component in a horizontal direction is obtained by passing an input image through a high pass filter in a horizontal direction (step 114), and a coefficient Cvx associated with the high frequency component in a vertical direction is obtained by passing the input image through a high pass filter in vertical direction (step 210).

Figures 3, 4:
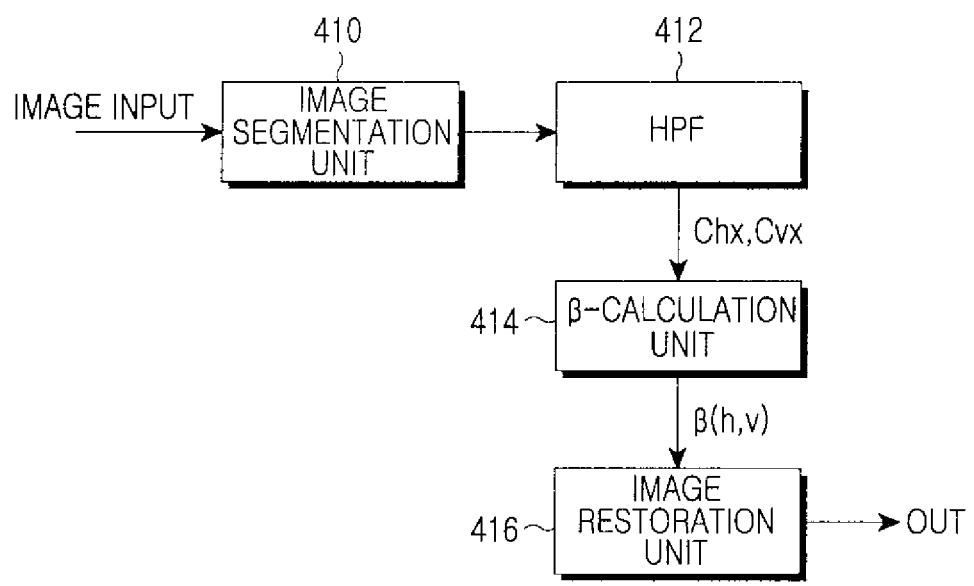
FIG. 3 an exemplary diagram illustrating a horizontal direction and a vertical direction of a high-pass filtered image in a blur removing method without introducing ringing-artifact according to an embodiment of the present invention.
FIG. 4 is a block structure diagram illustrating an image processing unit of an apparatus for removing blur without introducing ringing-artifact according to an embodiment of the present invention.

In FIG. 3, a horizontal direction and a vertical direction of an image subjected to high pass filtering by the high pass filter are illustrated. The coefficients Chx and Cvx in a horizontal direction and a vertical direction, respectively, of an image obtained in step 210 are graded and classified in accordance with equation (4) as (step 212):

$Cvx[h][v]=2$ if $Cvx[h][v]>th\_up$ $Cvx[h][v]=1$ else if $Cvx[h][v]>th\_dw$ $Cvx[h][v]=0$ otherwise $Chx[h][v]=2$ if $Chx[h][v]>th\_up$ $Chx[h][v]=2$ else if $Chx[h][v]>th\_dw$ $Chx[h][v]=2$ otherwise  (4)

where th_up and th_dw are predetermined threshold values, so that absolute values in a horizontal direction and a vertical direction, respectively, of a predetermined image can be compared with the predetermined threshold values.

The coefficients Chx and Cvx associated with a high frequency component in a horizontal direction and a vertical direction, respectively, are sequentially applied to a dilation calculation and an erosion calculation. The dilation calculation is performed as expressed in equation (5) (steps 214 and 216), and the erosion calculation is performed as expressed in equation (6) (steps 218 and 220):

$$\text{dilation\_h}[h][v] = 1 \text{ if} \quad (5)$$

$$\begin{pmatrix} Chx[h-1][v-1] != 0 || Chx[h-1][v] != 0 || Chx[h-1][v+1] != 0 || \\ Chx[h][v-1] != 0 || Chx[h][v] != 0 || Chx[h][v+1] != 0 || \\ Chx[h+1][v-1] != 0 || Chx[h+1][v] != 0 || Chx[h+1][v+1] != 0 \end{pmatrix}$$

$\text{dilation\_h}[h][v] = 0$ otherwise $\text{dilation\_v}[h][v] = 1$ if $$\begin{pmatrix} Cvx[h-1][v-1] != 0 || Cvx[h-1][v] != 0 || Cvx[h-1][v+1] != 0 || \\ Cvx[h][v-1] != 0 || Cvx[h][v] != 0 || Cvx[h][v+1] != 0 || \\ Cvx[h+1][v-1] != 0 || Cvx[h+1][v] != 0 || Cvx[h+1][v+1] != 0 \end{pmatrix}$$

$\text{dilation\_v}[h][v] = 0$ otherwise $\text{erosion\_h}[h][v] = 1$ if  (6)

$$\begin{pmatrix} \text{dilation\_h}[h-1][v-1] != 0 \,\&\&\, \text{dilation\_h}[h-1][v] != 0 \,\&\& \\ \text{dilation\_h}[h-1][v+1] != 0 \,\&\&\, \text{dilation\_h}[h][v-1] != 0 \,\&\& \\ \text{dilation\_h}[h][v] != 0 \,\&\&\, \text{dilation\_h}[h][v+1] != 0 \,\&\& \\ \text{dilation\_h}[h+1][v-1] != 0 \,\&\&\, \text{dilation\_h}[h+1][v] != 0 \,\&\& \\ \text{dilation\_h}[h+1][v+1] != 0 \end{pmatrix}$$

$\text{erosion\_h}[h][v] = 0$ otherwise $\text{erosion\_v}[h][v] = 1$ if $$\begin{pmatrix} \text{dilation\_v}[h-1][v-1] != 0 \,\&\&\, \text{dilation\_v}[h-1][v] != 0 \,\&\& \\ \text{dilation\_v}[h-1][v+1] != 0 \,\&\&\, \text{dilation\_v}[h][v-1] != 0 \,\&\& \\ \text{dilation\_v}[h][v] != 0 \,\&\&\, \text{dilation\_v}[h][v+1] != 0 \,\&\& \\ \text{dilation\_v}[h+1][v-1] != 0 \,\&\&\, \text{dilation\_v}[h+1][v] != 0 \,\&\& \\ \text{dilation\_v}[h+1][v+1] != 0 \end{pmatrix}$$

$\text{erosion\_v}[h][v] = 0$ otherwise

Note that the terms, "&&" represents "and" in the above equation. As Chx and Cvx of each of pixels are determined by using a threshold value, the connection between pixels can not be smooth. However, in case of the usage of the dilation calculation and the erosion calculation, noise can be removed and the connection between pixels becomes smooth.

Noise is removed by the dilation calculation and the erosion calculation procedures.

Further, since the resultant values, erosion_h and erosion_v, obtained through the above calculations may belong to an area different from that of the coefficients Chx and Cvx associated with high frequency components, a value existing in only the erosion calculation requires interpolation. Therefore, in the image interpolation to which the erosion calculation is applied, a linear interpolating direction is also determined according to a horizontal direction and a vertical direction of the high-pass filtered image. Chx_i and Cvx_i are obtained from an image linearly interpolated by the above procedures using equation (7) (steps 222 and 224) as:

$$\text{Chx\_i}[h][v] = \frac{Chx[h-1][v] + Chx[h+1][v]}{2} \quad \text{if } (Chx[h][v] = 0 \,\&\&\, \text{erosion\_h}[h][v] \,!= 0) \quad (7)$$
$$\text{Chx\_i}[h][v] = Chx[h][v] = Chx[h][v] \quad \text{otherwise}$$

$$\text{Cvx\_i}[h][v] = \frac{Cvx[h][v-1] + Cvx[h][v+1]}{2} \quad \text{if } (Cvx[h][v] = 0 \,\&\&\, \text{erosion\_v}[h][v] \,!= 0)$$
$$\text{Cvx\_i}[h][v] = Cvx[h][v] \quad \text{otherwise}$$

From an obtained image as the result of equation (7), weights β_h and β_v for a horizontal direction and a vertical direction, respectively, may be obtained (steps 226 and 228). More specifically, assuming that a size of a blur kernel is (2s+1), β_h and β_v can be obtained by applying the obtained image from equation (7) to the below algorithm as.

```
if (Chx_i[h][v] > 0){                              (7)
    if (Chx_i[h−s][v] != 0 && ... && Chx_i[h+s][v] != 0){
        β_h[h][v] = C_H;
    }
}
else{
    β_h[h][v] = C_M;
    }
}
else{
    β_h[h][v] = C_L;
}
if (Cvx_i[h][v] > 0{
    if (Cvx_i[h][v−s] != 0 && ... && Cvx_i[h][v+s] != 0){
        β_v[h][v] = C_H;
    }
}
else{
    β_v[h][v] = C_M;
    }
}
else{
    β_v[h][v] = C_L;
}
```

Factors $C_H$, $C_M$, and $C_L$ are associated with predetermined constant values.

A final β [h][v] can be obtained by applying β_h and β_v obtained from the above procedure to equation (8) (step 230) as:

$$\beta[h][v] = \beta\_h[h][v] \text{ if } \beta\_h[h][v] > \beta\_v[h][v]$$
$$\beta[h][v] = \beta\_v[h][v] \text{ otherwise} \quad (8)$$

An image without ringing-artifact is obtained by applying the weight β of a high-pass filtered image obtained by equation (8) to a closed form of equation (9) or to an iterative form of equation (10), which is a closed form or an iterative form, respectively, of image restoration processing operation.

$$x = \text{inv}(H'H + \alpha C'C)H'y * (1 - \beta(h,v)) + \beta(h,v) * y \quad (9)$$

$$x(n+1) = x(n) + \beta(h,v) * (H'y - (H'H + \alpha C'C)x(n)) \quad (10)$$

where h and v refer to a horizontal area and a vertical direction area, respectively, of an image.

Referring to the above-mentioned operational flowchart of the present invention and FIG. 4, component elements according to a preferred embodiment of the present invention are described.

FIG. 4 shows a block structure diagram illustrating an image processing unit of an apparatus for removing blur without introducing ringing-artifact according to an embodiment of the present invention. Referring to FIG. 4, the image processing unit includes an image segmentation unit 410, a high pass filter (HPF) 412, a β-calculation unit 414, and an image restoration unit 416.

In accordance with the principles of the invention, the image segmentation unit 410 detects blur of an input image, segments the image according to an amount of blur to be removed, and then outputs the segmented images.

Further, the HPF 412 performs high pass filtering for each image segment in a horizontal direction and a vertical direction. The coefficients Chx and Cvx which are coefficients associated with a horizontal direction and a vertical direction, respectively, for a high frequency component, are then obtained.

The β-calculation unit 414 calculates β, which is a weight of an image, by using the coefficients Chx and Cvx.

More specifically, absolute values of the coefficients Chx and Cvx associated with the high frequency components obtained from the high pass filter 412 and predetermined threshold values are compared, determined, classified, and arranged. Noise in the segment image is then removed and the connection between the pixels of noise-removed image becomes smooth through a dilation calculation and an erosion calculation. =>In this regard, please note that we have deleted "The coefficients Chx and Cvs . . . of the noise removed image" and added the above portion. Further, when the resultant values, erosion_v and erosion_h, obtained from the erosion calculation have values that are different than Chx and Cvx, linear interpolation is applied to the values resulting from the erosion calculation, so that a linear interpolating direction is determined according to the directions of Chx and Cvx. The linear interpolation is performed in order to prevent an image loss caused by a dilation calculation and an erosion calculation, and each β value in a horizontal direction and a vertical direction of the image segment is calculated from the linear-interpolated result values, i.e. Chx_i and Cvx_i. At this time, β_h and β_v in each direction are obtained by applying the size of the blur kernel to a predetermined algorithm according to an embodiment of the present invention.

Further, the image restoration unit 416 applies the obtained β_h and β_v values to an iterative form of image restoration, and then outputs an image without ringing-artifact. In another aspect of the invention, the restoration unit 416 applies the obtained β_h and β_v values to a closed form image restoration and then outputs an image without ringing-artifact.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the method and the apparatus for removing blur without ringing-artifact according to an embodiment of the present invention can be implemented. While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image processing method for removing blur in a screen image, said method comprising:
    detecting blur in an input image;
    segmenting the image according to an amount of the detected blur;
    performing a high pass filtering for each segmented image in a horizontal direction and a vertical direction to obtain corresponding coefficients associated with each of the horizontal and vertical directions;
    obtaining weights corresponding to each horizontal and vertical direction, wherein the weights are calculated by applying the coefficients to predetermined weight calculation equations; and
    restoring the image segment by applying the detected weights to one of an iterative form and a closed form of an image restoration.

2. The method as claimed in claim 1, wherein the step of obtaining weights comprises:
    classifying coefficients corresponding to the obtained weights associated with each direction;
    performing a dilation calculation and an erosion calculation by using the classified coefficients performing a linear interpolation of the coefficient of each of pixels by the usage of coefficients of adjacent pixels; and
    obtaining a weight β in each of a horizontal direction and a vertical direction by using resultant values derived from the linear interpolation and by using a size of a blur kernel.

3. The method as claimed in claim 2, wherein the weight β comprises a pixel value of each pixel, which is generated by high-pass filtering a predetermined image segment and by applying a dilation calculation and an erosion calculation to the image.

4. The method of as claimed in claim 2, wherein, in classifying the coefficients, absolute values of coefficients Chx and Cvx for a high frequency component in a horizontal direction and a vertical direction, respectively, are determined after comparison with predetermined threshold values.

5. The method as claimed in claim 2, wherein performing the linear interpolation is performed increases a resolution of a predetermined image when a size of the image is enlarged or reduced, or the image is rotated.

6. The method as claimed in claim 2, wherein classifying the coefficients is determined as:

$Cvx[h][v]=2$ if $Cvx[h][v]>th\_up$ $Cvx[h][v]=1$ else if $Cvx[h][v]>th\_dw$ $Cvx[h][v]=0$ otherwise $Chx[h][v]=2$ if $Chx[h][v]>th\_up$ $Chx[h][v]=2$ else if $Chx[h][v]>th\_dw$ $Chx[h][v]=2$ otherwise.

7. The method of as claimed in claim 2, wherein the dilation calculation and the erosion calculation are sequentially applied as:

$\text{dilation\_h}[h][v] = 1$ if $$\begin{pmatrix} Chx[h-1][v-1] != 0 || Chx[h-1][v] != 0 || Chx[h-1][v+1] != 0 || \\ Chx[h][v-1] != 0 || Chx[h][v] != 0 || Chx[h][v+1] != 0 || \\ Chx[h+1][v-1] != 0 || Chx[h+1][v] != 0 || Chx[h+1][v+1] != 0 \end{pmatrix}$$

$\text{dilation\_h}[h][v] = 0$ otherwise $\text{dilation\_v}[h][v] = 1$ if $$\begin{pmatrix} Cvx[h-1][v-1] != 0 || Cvx[h-1][v] != 0 || Cvx[h-1][v+1] != 0 || \\ Cvx[h][v-1] != 0 || Cvx[h][v] != 0 || Cvx[h][v+1] != 0 || \\ Cvx[h+1][v-1] != 0 || Cvx[h+1][v] != 0 || Cvx[h+1][v+1] != 0 \end{pmatrix}$$

$\text{dilation\_v}[h][v] = 0$ otherwise, and $\text{erosion\_h}[h][v] = 1$ if $$\begin{pmatrix} \text{dilation\_h}[h-1][v-1] != 0 \ \&\&\ \text{dilation\_h}[h-1][v] != 0 \ \&\&\ \\ \text{dilation\_h}[h-1][v+1] != 0 \ \&\&\ \text{dilation\_h}[h][v-1] != 0 \ \&\&\ \\ \text{dilation\_h}[h][v] != 0 \ \&\&\ \text{dilation\_h}[h][v+1] != 0 \ \&\&\ \\ \text{dilation\_h}[h+1][v-1] != 0 \ \&\&\ \text{dilation\_h}[h+1][v] != 0 \ \&\&\ \\ \text{dilation\_h}[h+1][v+1] != 0 \end{pmatrix}$$

$\text{erosion\_h}[h][v] = 0$ otherwise $\text{erosion\_v}[h][v] = 1$ if $$\begin{pmatrix} \text{dilation\_v}[h-1][v-1] != 0 \ \&\&\ \text{dilation\_v}[h-1][v] != 0 \ \&\&\ \\ \text{dilation\_v}[h-1][v+1] != 0 \ \&\&\ \text{dilation\_v}[h][v-1] != 0 \ \&\&\ \\ \text{dilation\_v}[h][v] != 0 \ \&\&\ \text{dilation\_v}[h][v+1] != 0 \ \&\&\ \\ \text{dilation\_v}[h+1][v-1] != 0 \ \&\&\ \text{dilation\_v}[h+1][v] != 0 \ \&\&\ \\ \text{dilation\_v}[h+1][v+1] != 0 \end{pmatrix}$$

$\text{erosion\_v}[h][v] = 0$ otherwise.

8. An image processing apparatus for removing blur in a screen image, comprising:
  an image segmentation unit for detecting an amount of blur in an input image, and segmenting the image according to an amount of blur to be removed;
  a high pass filter for filtering each image segment in a horizontal direction and a vertical direction to obtain corresponding coefficients associated with each of the horizontal and vertical directions, and outputting the coefficients associated with each direction;
  a β-calculation unit for calculating a weight β associated with each direction by applying the coefficients to predetermined weight calculation equations; and
  an image restoration unit for restoring the corresponding image by applying the calculated β to one of: an iterative form and a closed form of image restoration.

9. The apparatus as claimed in claim 8, wherein the β-calculation unit:
  classifies a horizontal direction and a vertical direction of the filtered image;
  performs a dilation calculation and an erosion calculation of the image;
  connects the coefficients associated with each direction; and
  performs a linear interpolation of the coefficient of each of pixels by the usage of coefficients of adjacent pixels.

10. The apparatus as claimed in claim 8, wherein the β-calculation unit obtains weights β in a horizontal direction and a vertical direction of an image by using a size of a blur kernel.

11. An image processing apparatus for removing blur in a screen image, comprising
  a processor in communication with a memory, the memory including code which when accessed by the processor enables the processor to execute the steps of:
  detecting blur in an input image;
  segmenting the image according to an amount of the detected blur;
  performing a high pass filtering for each segmented image in a horizontal direction and a vertical direction to obtain corresponding coefficients associated with each of the horizontal and vertical directions;
  obtaining weights corresponding to each horizontal and vertical direction, wherein the weights are calculated by applying the coefficients to predetermined weight calculation equations; and
  restoring the image segment by applying the obtained weights to one of an iterative form and a closed form of an image restoration process.

12. The apparatus as claimed in claim 11, wherein the step of obtaining weights comprises the steps of:
  classifying coefficients corresponding to the obtained weights associated with each direction;
  performing a dilation calculation and an erosion calculation by using the classified coefficients;
  performing a linear interpolation of the coefficient of each of pixels by the usage of coefficients of adjacent pixels; and
  obtaining a weight β in each of a horizontal direction and a vertical direction by using resultant values derived from the linear interpolation and by using a size of a blur kernel.

13. The apparatus as claimed in claim 12, wherein the weight β comprises a pixel value of each pixel, which is generated by high-pass filtering a predetermined image segment and by applying a dilation calculation and an erosion calculation to the image.

14. The apparatus as claimed in claim 12, wherein, in classifying the coefficients, absolute values of coefficients Chx and Cvx for a high frequency component in a horizontal direction and a vertical direction, respectively, are determined after comparison with predetermined threshold values.

15. The apparatus as claimed in claim 12, wherein performing the linear interpolation is performed increases a resolution of a predetermined image when a size of the image is enlarged or reduced, or the image is rotated.

16. The apparatus as claimed in claim 12, wherein classifying the coefficients is determined as:

$Cvx[h][v]=2$ if $Cvx[h][v]>th\_up$ $Cvx[h][v]=1$ else if $Cvx[h][v]>th\_dw$ $Cvx[h][v]=0$ otherwise $Chx[h][v]=2$ if $Chx[h][v]>th\_up$ $Chx[h][v]=2$ else if $Chx[h][v]>th\_dw$ $Chx[h][v]=2$ otherwise.

17. The apparatus as claimed in claim 12, wherein the dilation calculation and the erosion calculation are sequentially applied as:

$\text{dilation\_h}[h][v] = 1$ if $$\begin{pmatrix} Chx[h-1][v-1] != 0 || Chx[h-1][v] != 0 || Chx[h-1][v+1] != 0 || \\ Chx[h][v-1] != 0 || Chx[h][v] != 0 || Chx[h][v+1] != 0 || \\ Chx[h+1][v-1] != 0 || Chx[h+1][v] != 0 || Chx[h+1][v+1] != 0 \end{pmatrix}$$

$\text{dilation\_h}[h][v] = 0$ otherwise $\text{dilation\_v}[h][v] = 1$ if $$\begin{pmatrix} Cvx[h-1][v-1] != 0 || Cvx[h-1][v] != 0 || Cvx[h-1][v+1] != 0 || \\ Cvx[h][v-1] != 0 || Cvx[h][v] != 0 || Cvx[h][v+1] != 0 || \\ Cvx[h+1][v-1] != 0 || Cvx[h+1][v] != 0 || Cvx[h+1][v+1] != 0 \end{pmatrix}$$

$\text{dilation\_v}[h][v] = 0$ otherwise, and $\text{erosion\_h}[h][v] = 1$ if $$\begin{pmatrix} \text{dilation\_h}[h-1][v-1] != 0\ \&\&\ \text{dilation\_h}[h-1][v] != 0\ \&\& \\ \text{dilation\_h}[h-1][v+1] != 0\ \&\&\ \text{dilation\_h}[h][v-1] != 0\ \&\& \\ \text{dilation\_h}[h][v] != 0\ \&\&\ \text{dilation\_h}[h][v+1] != 0\ \&\& \\ \text{dilation\_h}[h+1][v-1] != 0\ \&\&\ \text{dilation\_h}[h+1][v] != 0\ \&\& \\ \text{dilation\_h}[h+1][v+1] != 0 \end{pmatrix}$$

$\text{erosion\_h}[h][v] = 0$ otherwise $\text{erosion\_v}[h][v] = 1$ if $$\begin{pmatrix} \text{dilation\_v}[h-1][v-1] != 0\ \&\&\ \text{dilation\_v}[h-1][v] != 0\ \&\& \\ \text{dilation\_v}[h-1][v+1] != 0\ \&\&\ \text{dilation\_v}[h][v-1] != 0\ \&\& \\ \text{dilation\_v}[h][v] != 0\ \&\&\ \text{dilation\_v}[h][v+1] != 0\ \&\& \\ \text{dilation\_v}[h+1][v-1] != 0\ \&\&\ \text{dilation\_v}[h+1][v] != 0\ \&\& \\ \text{dilation\_v}[h+1][v+1] != 0 \end{pmatrix}$$

$\text{erosion\_v}[h][v] = 0$ otherwise.

18. The apparatus as claimed in claim 12, further comprising:
  a display unit in communication with said processor.

* * * * *

UNITED STATES PATENT AND TRADEMARK OFFICE
CERTIFICATE OF CORRECTION

PATENT NO. : 8,411,981 B2
APPLICATION NO. : 12/185156
DATED : April 2, 2013
INVENTOR(S) : Min-Kyu Park et al.

It is certified that error appears in the above-identified patent and that said Letters Patent is hereby corrected as shown below:

In the Claims:

Column 8, Claim 4, Line 6 should read as follows:
--...The method as claimed in...--

Column 8, Claim 7, Line 29 should read as follows:
--...The method as claimed in...--

Signed and Sealed this
Twenty-first Day of May, 2013

Teresa Stanek Rea
*Acting Director of the United States Patent and Trademark Office*